US008803472B2

(12) United States Patent  (10) Patent No.: US 8,803,472 B2
Adelman et al.  (45) Date of Patent: Aug. 12, 2014

(54) SAFETY CIRCUIT FOR CHARGING DEVICES

(75) Inventors: Lonnie W. Adelman, La Jolla, CA (US);
Clarence R. King, III, Solana Beach, CA (US); Patrick Regan, San Diego, CA (US); Jose De Jesus Ramirez, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1845 days.

(21) Appl. No.: 11/829,904

(22) Filed: Jul. 28, 2007

(65) Prior Publication Data

US 2009/0027003 A1  Jan. 29, 2009

(51) Int. Cl.
*H02J 7/00*  (2006.01)

(52) U.S. Cl.
CPC ................................ *H02J 7/0029* (2013.01)
USPC ........................... 320/106; 320/162; 320/165

(58) Field of Classification Search
USPC .................................. 320/106, 162, 165, 167
See application file for complete search history.

(56) References Cited

U.S. PATENT DOCUMENTS

| | | | |
|---|---|---|---|
| 4,577,144 A | 3/1986 | Hodgman | |
| 4,577,145 A | 3/1986 | Mullersman | |
| 4,628,243 A | 12/1986 | Hodgman | |
| 5,600,224 A | 2/1997 | Mody | |
| 5,638,246 A | 6/1997 | Sakamoto | |
| 5,847,539 A | 12/1998 | Akiya | |
| 5,998,962 A | 12/1999 | Akiya | |
| 6,043,625 A * | 3/2000 | Dowe | 320/106 |
| 6,160,389 A | 12/2000 | Watts | |
| 6,191,551 B1 | 2/2001 | Fischer | |
| 6,377,020 B1 | 4/2002 | Yokoyama | |
| 6,479,962 B2 | 11/2002 | Ziemkowski | |
| 6,815,929 B1 | 11/2004 | Dagan | |
| 6,989,649 B2 | 1/2006 | Mehlhorn | |
| 7,012,402 B2 | 3/2006 | Miller | |
| 7,038,400 B2 | 5/2006 | Rimmer | |
| 2004/0263123 A1 * | 12/2004 | Breen et al. | 320/128 |
| 2006/0023383 A1 | 2/2006 | Thiery | |
| 2006/0254893 A1 | 11/2006 | Mills | |
| 2008/0278119 A1 * | 11/2008 | Veselic | 320/161 |

FOREIGN PATENT DOCUMENTS

| | | | |
|---|---|---|---|
| EP | 1300920 A1 | 4/2003 | |
| JP | 3103034 A | 4/1991 | |

\* cited by examiner

*Primary Examiner* — Edward H Tso
*Assistant Examiner* — Aaron Piggush

(57) ABSTRACT

Systems and methods for implementing a safety circuit in charging devices are disclosed. In an exemplary embodiment, a method may include closing a latch to stop delivery of a charging current to a battery when voltage produced by the battery indicates that the battery is non-rechargeable. The method may also include dropping a threshold from an initial value for the voltage produced by the battery to a baseline value so that the latch remains closed even if the voltage produced by the non-rechargeable battery drops below the initial value of the threshold. The method may also include resetting the latch each time a battery is connected to the charging device.

16 Claims, 3 Drawing Sheets

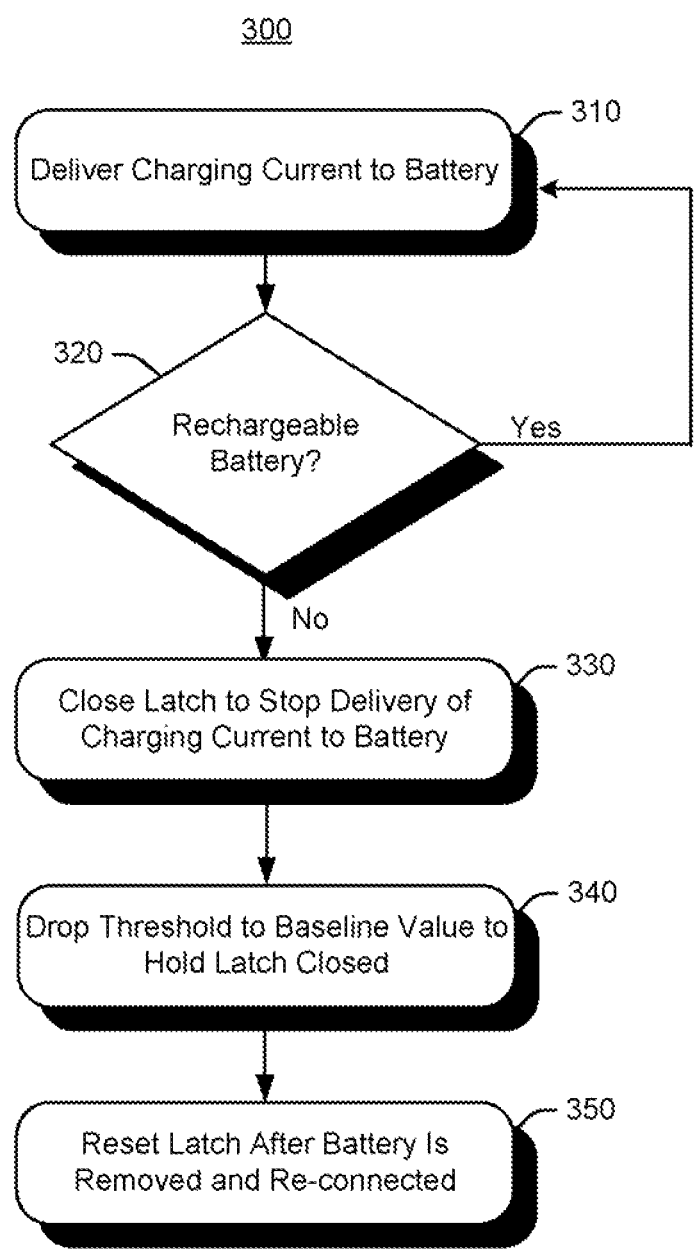

SAFETY CIRCUIT FOR CHARGING DEVICES

BACKGROUND

Charging devices for charging batteries are commonly provided for digital cameras, mobile phones, personal digital assistants (PDAs) and a wide variety of other consumer electronic devices. Although not limited to such a configuration, a charging device may be provided as part of a docking station for a camera so that the batteries in the camera charge every time the camera is placed in the docking station.

During operation, the charging device provides a charging current to the batteries in the camera (or other electronic device) until the batteries are charged, and then provides a lower or "trickle" current to the batteries to maintain the charge until the camera is removed from the docking station. It is not uncommon, however, for consumers to use non-rechargeable batteries in the camera and then accidentally connect the camera to the docking station.

To prevent damage and other adverse effects that may occur when attempting to charge a non-rechargeable battery, charging devices typically include a chaise terminator for use in the event that a non-rechargeable battery is detected. Sometimes, a voltage comparator with hysteresis and a reference threshold voltage are used to detect the presence of a non-rechargable battery and stop charging. This method establishes a very low threshold voltage after charging is inhibited and requires that the detected non-rechargable battery voltage drop below the threshold in order for the comparator to turn the charging current on again.

Unfortunately, this low threshold voltage may never be reached and thus the comparator does not turn the charging current back on unless the charging device is power-cycled. Power-cycling the charging device in order to reactivate the charging device may be frustrating to the user. In addition, the low threshold is established using resistors with finite tolerances, which adds to the tolerance stack-up of the system.

Another potential problem can occur when the voltage generated by the non-rechargeable battery and detected by the comparator drops below its threshold after the charge current stops. In this case, the charging system oscillates between charging ON and charging OFF while potentially causing the non-rechargeable battery to exceed safe temperature limits, split open, and spill potentially harmful electrolyte.

Processor-driven shut-offs are also available. However, these typically operate on digital input, which are more expensive, may be as sensitive to small changes in the voltage, are more complex, and therefore may not accurately detect the difference between rechargeable and non-rechargeable batteries, or may fail more frequently.

BRIEF DESCRIPTION OF THE DRAWINGS

FIG. 3 is a flowchart illustrating exemplary operations which may be implemented by a safety circuit in a charging device.

DETAILED DESCRIPTION

Briefly, a safety circuit is disclosed which may be implemented in charging devices to stop charging a battery (or batteries as the case may be) when the battery is a non-rechargeable battery. In exemplary embodiments, the safety circuit may be voltage programmable with digital output. Accordingly, the safety circuit is sensitive to small voltage changes, while greatly reducing tolerance stack-up. In addition, the safety circuit can be easily reset by disconnecting and then reconnecting the battery (e.g., by undocking/docking the camera in the docking station) without having to cycle power to the charging device. In addition, unsafe oscillatory charging of a non-rechargeable battery may be eliminated by reducing the safety circuit threshold for resuming charging to baseline value.

Although exemplary embodiments are described herein for purposes of illustration with reference to a charging device built into a docking station for a camera, it is understood that the systems and methods are not limited to any particular electronics device and can be used with any of a wide variety of charging devices for charging rechargeable batteries.

Exemplary System

Figure 1:
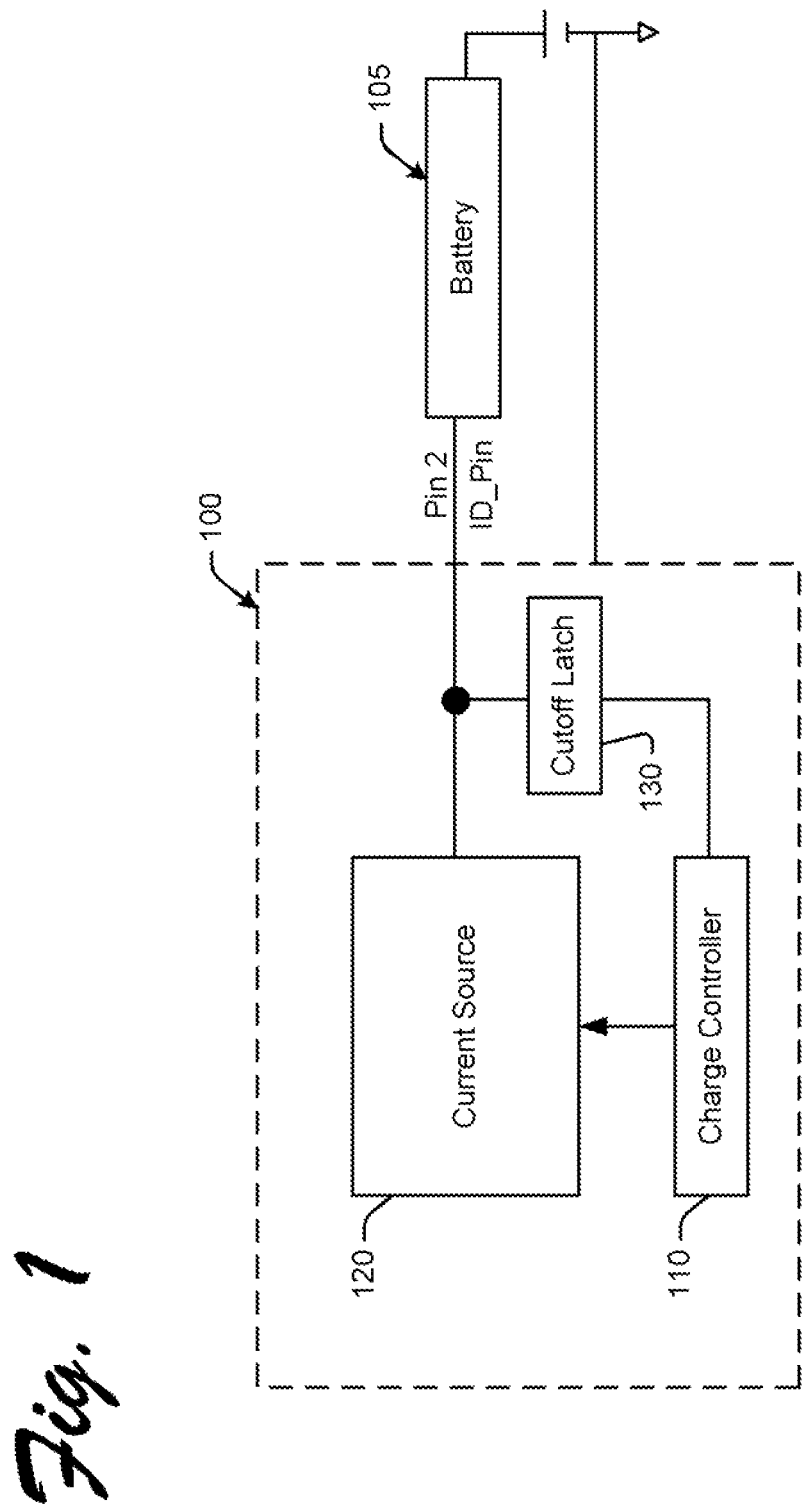
FIG. 1 is a high-level block diagram showing functional components of an exemplary charging device which may implement a safety circuit.

FIG. 1 is a high-level block diagram showing functional components of an exemplary charging device 100 which may implement a safety circuit. In an exemplary embodiment, the charging device 100 may be provided with (e.g., built-in to) a printer with a docking station for a camera. The charging device 100 may include a nominal a charge controller 110, a constant current source 120, and a cutoff latch 130. A combined physical communication, stack voltage, and charge current interface is provided between the charging device 100 and the camera (with installed batteries) via a connector pin (e.g., pin 2 on a mini-USB connector). When the camera is docked, the camera is identified by the charge controller 110 via this pin on the mini-USB connector. In response, the charge controller 110 activates the current source 120 which in turn supplies a charging current to the battery (or batteries) 105 installed in the camera. In addition, the charge controller 110 may read the stack voltage through a pin (e.g., pin 2 on a mini-USB connector).

Current sources for charging batteries are well-understood in the electronics arts. However, the following description of an exemplary current source 120 is provided for purposes of illustration to aid in understanding operation of the charge controller 110 and cutoff latch 130. In this example, the constant current source 120 provides an output current of 810 mA nominally, with tolerance between 720 mA and 910 mA. A transistor is provided to serve as the current pass element. During fast charging the transistor is always on. When the charge controller detects that a rechargeable battery 105 installed in the camera (as described in more detail below) is nearly fully charged, an integrated circuit (IC) pulse width modulates the transistor providing a much lower average current. A resistor-capacitor (RC) circuit may also be provided to slow the rising edge of these pulses to prevent ringing, which has been shown to inadvertently trigger the cutoff latch 130 during charging of Nickel Metal Hydride (NiMH) batteries, thus inhibiting the top-off and trickle-charge modes. The current source 120 is controlled by the IC. When the charging device 100 is first activated and a battery 105 is present, input to the IC goes high (e.g., 1) indicating fast-charge mode. A nominal 810 mA current is supplied to the camera via the connector.

During normal operation (i.e., when a rechargeable battery 105 is connected), the charge controller 110 monitors the voltage at the top of the battery stack. For example, the charge controller 110 may take an average sample every 17 seconds. When the voltage decreases by 2.5 mV±2.5 mV during this time, the charge controller 110 signals the current source 120 to transition from a fast-charge mode to a top-off mode (resulting in an average charging current of 50 mA). When a time-out is reached (e.g., at 160 minutes), the charge controller 110 signals the current source 120 to transition from top off mode to a trickle charge mode. In an exemplary voltage setting (2.5V), this provides for a lower charge current and results in charge termination for a −2.5 mV±2.5 mV voltage, decrease and a time out of 160 minutes.

It has been demonstrated that alkaline. Lithium, mixed chemistry cells, and other non-rechargeable batteries rise above 3.7V at the ID_Pin after fast charge initiation. To prevent unsafe charging of these cells, the circuit includes a cutoff latch triggered at 3.7V. The cutoff latch 130 may also be connected to the charge controller 110 to serve as a true latch-off condition at a threshold of 3.7V at the top of the stack, as will be better understood with reference to the exemplary circuit diagram shown in FIG. 2.

Figure 2:
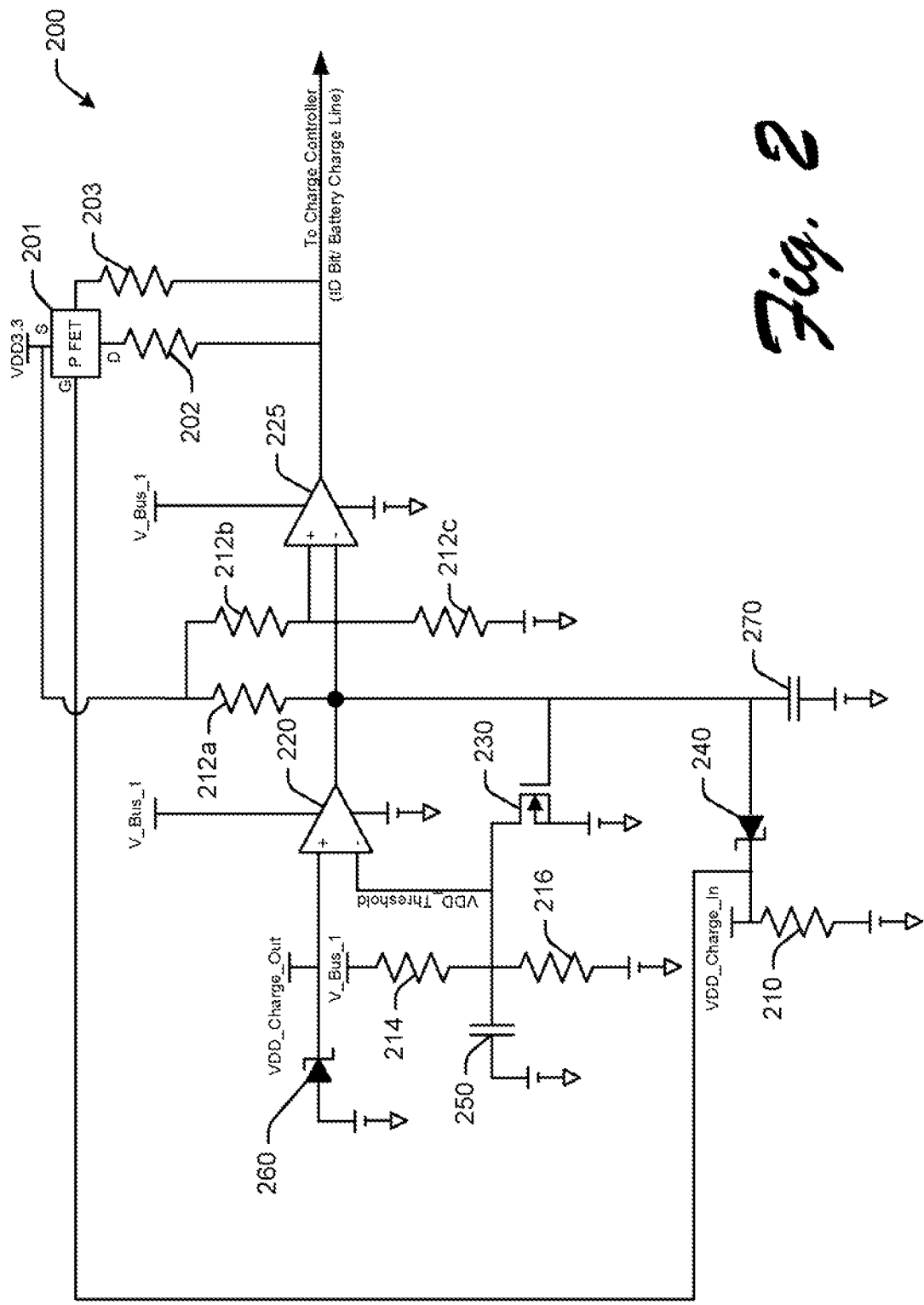
FIG. 2 is a schematic diagram showing an exemplary safety circuit.

FIG. 2 is a schematic diagram showing an exemplary safety circuit 200. In an exemplary embodiment, the safety circuit 200 may be implemented as a voltage programmable and digitally resettable latch (e.g., cutoff latch 130 in FIG. 1). At startup, when the camera is docked and before the camera is enumerated by the charging device, a power supply VDD_Charge_In (e.g., 5V) is disabled via low impedance to ground. During this time, resistor 210 ensures that filter capacitor 270 in the charging circuit doesn't charge due to current from resistor 212a and present anything but a logic 0 prior to enabling the power supply VDD_Charge_In. While the power supply VDD_Charge_In is disabled, P Channel MOSFET 201 is turned on, thus switching VDD3.3 to resistor 202, allowing the camera to read 3.3V through a 1K resistor and indicating that the camera is connected (instead of, e.g., a demo dongle) on the multiplexed (ID Bit/Battery Charge Line) VDD_CHARGE_OUT line on pin 2 of the mini-USB connector.

Once the camera is enumerated, the power supply to the charger by way of 5 VDC being applied to VDD_Charge_In is turned on and the battery begins charging. Simultaneously, PFET 201 turns off because VDD_Charge_In is now about +5V (±4.5%), and resistor 202 is switched out of the circuit, thus completing the ID cycle (e.g. camera or demo dongle decision) and avoiding a possible Alkaline battery vent (e.g., when the case of the battery cracks and electrolyte leaks out) by continuously leaking 3 mA into a non-chargeable battery. Note that resistor 203 (e.g., 100 KOhm) is designed to supply 33 uA of current to keep the camera on even after charge cutoff. This level of current is slightly lower than the level of current that could vent an Alkaline battery that continuously sinks current. V_Bus_1 represents a 5 V power supply (different from VDD_Charge_In).

If, at any time, the charging voltage produced by the battery increases such that a voltage is sensed higher than about 3.7V, the programmable latch circuit (primarily consisting of comparators 220 and 225, Field Effect Transistor or FET 230, and resistors 212a, 212b, 212c, 214 and 216) cuts off charging completely. This prevents charging of alkaline, lithium, and mixed chemistry cells by effectively cutting-off charging current to the battery.

It is noted that a dual comparator may also be implemented in place of separate comparators 220 and 225, or by inverting the (+) and (−) inputs of 220 and eliminating 225 by connecting the output of 220 directly to the charge controller. In any event, the voltage produced by the battery at VDD_Charge_Out may be compared at comparator 220 to an initial threshold value (VDD_Threshold). The initial threshold value in comparator 220 is set by resistors 214 and 216. In an exemplary embodiment, the positive input of the first stage is set to an initial threshold value (e.g., 3.7 V).

During normal operation, VDD_Charge_Out stays below this initial threshold value and output from comparator 220 is low. The comparator 225 acts as an open collector inverter, making the latch output high. This output is connected to the charge controller and, at this point, is invisible to the charge controller due to its open collector output.

During operation, however, if the voltage produced by the battery exceeds that of a typical rechargeable battery (e.g., the stack voltage at VDD_Charge_Out rises above 3.7V), output from the first comparator 220 goes high, which results in output from the second comparator 225 going low and pulling the charge controller to ground and turning off the charging current. In addition, FET 230 turns on, lowering VDD_Threshold to a baseline (e.g., 0V) value, latching comparator 220 in the high state, and comparator 225 in the low state, thus holding off the charge current even if a different battery (stack) voltage is detected.

At this point, the only way to reset the latch is to physically remove the camera from the printer. This causes VDD_Charge_In to turn off and pull the gate of FET 230 low through diode 240, which turns off FET 230 and re-initiates the initial value for VDD_Threshold (e.g., to 3.7V). Diode 240 prevents VDD_Charge_In from activating FET 230 during normal NiMH charging.

It should be noted that the initial value for the threshold voltage in this example was 3.7V, but the threshold may be set to any voltage in the common mode range of the comparator chosen for the circuit. Once the threshold voltage for the latch is met, the comparator 220 output changes to the latched (active) voltage, which is approximately 3.3V. During the transition from 0V to 3.3V, a latching FET 230 turns on and reestablishes the comparator voltage threshold to a baseline value of approximately 0V. By setting the threshold value to 0V, any voltage on the monitored line is higher than the threshold voltage, so the output of the comparator remains in the active state and inhibits the charging current.

The latch circuit may be reset by applying a logic 0 to blocking diode 240. In an exemplary embodiment, this may be enabled by docking/undocking the camera from the docking station. In other embodiments, this may be enabled by otherwise disconnecting/connecting the battery to the battery charger. In any event, when the cathode of diode 240 is brought to 0V, the gate of FET 230 is forced to approximately 0.3 V (which is lower than its gate-to-source threshold), thus turning FET 230 off, restoring the latch voltage threshold to 3.7V, and consequently the comparator output to the inactive state. When the camera is redocked, enumeration of the camera occurs, and charging can continue as described previously without having to cycle power.

Other components may also be provided to implement various optional features. For example, the initial threshold set by resistors 214 and 216 may be stabilized on the input to comparator 220 by a capacitor 250. In addition, a diode 260 may be provided on the input to comparator 220 to protect the circuit against a battery which has been installed backwards (a negative voltage for purposes described herein is a negative voltage at the VDD_Charge_out line that is caused by putting both camera batteries in backwards). Also by way of example, filtering capacitor 270 may be provided to reduce the effect of noise at resistors 212a-c.

It is noted that the exemplary systems described above with reference to specific circuit implementations are shown for illustrative purposes and are not intended to be limiting. Various component substitutions and alternate circuit designs will be well within the capability of those having ordinary skill in the art after becoming familiar with the teachings herein.

These substitutions and alternate circuit designs are also contemplated when interpreting the claims.

Exemplary Operations

FIG. 3 is a flowchart illustrating exemplary operations which may be implemented by a safety circuit in a charging device. In an exemplary embodiment, the operations 300 may be embodied in circuitry. For example, the components and connections depicted in FIG. 2 may be used to effect the operations in circuitry.

In operation 310, a charging current is delivered to begin charging a battery. For example, the charging current may be delivered to batteries in a camera connected to a charging device in a docking station for the camera. In operation 320, a determination is made whether the battery is rechargeable or non-rechargeable. For example, this determination may be made based on the voltage (or current) being drawn by the battery. If the voltage across the battery remains within acceptable limits, this may indicate that the battery is a rechargeable battery. If, however, the voltage across the battery exceeds an initial threshold value, this may indicate that the battery is a non-rechargeable battery.

If the battery is a rechargeable battery, charging operations continue by delivering current to the battery in operation 310. If the battery is non-rechargeable, a latch is closed to stop delivery of the charging current to the battery in operation 330. In operation 340, the threshold is dropped from an initial value for voltage produced voltage produced by the battery to a baseline value to hold the latch closed even if the voltage produced voltage produced by the non-rechargeable battery drops below the initial value of the threshold. Accordingly, the safety circuit renders the charging device ineffective to reduce or altogether prevent damage to the battery, the electronic device in which the battery is installed, and/or other adverse effects.

In operation 350, the latch may be reset each time a battery is connected to the charging device. For example, the latch may be reset when the camera is reattached to the docking station. Requiring the user to reattach the camera to the docking station before restarting the charging current helps ensure that the user has at least had the opportunity to contemplate the type of batteries that are in the camera, and the opportunity to replace the non-rechargeable batteries with rechargeable batteries.

The operations shown and described herein are provided to illustrate exemplary operations which may be implemented by a safety circuit in a charging device to stop charging the battery when the battery is non-rechargeable. It is noted that the operations are not limited to the ordering shown. In addition, still other operations (not shown in FIG. 3) will also be readily apparent to those having ordinary skill in the art after becoming familiar with the teachings herein.

It is noted that the exemplary embodiments shown and described are provided for purposes of illustration and are not intended to be limiting. Still other embodiments are also contemplated to implement a safety circuit for charging devices.

The invention claimed is:

1. A method comprising:
   a closing a latch to stop delivery of a charging current to a battery when voltage produced by the battery indicates that the battery is non-rechargeable;
   dropping a threshold from an initial value for the voltage produced by the battery to a baseline value so that the latch remains closed even if the voltage produced by the non-rechargeable battery drops below the initial value of the threshold;
   resetting the latch each time a battery is connected to the charging device; and
   providing a non-charging current to a device including the battery to keep the device powered on even after charge cutoff, the non-charging current is less than a level of current that vents a non-rechargeable battery.

2. The method of claim 1, further comprising resetting the threshold to the initial value each time a battery is connected to the charging device.

3. The method of claim 2, wherein resetting the threshold is in response to a signal from an electronic device holding the battery.

4. The method of claim 3, wherein the signal is delivered from the electronic device when the electronic device is connected to the charging device.

5. The method of claim 3, wherein the signal from a signal that accords with a Universal Serial Bus specification.

6. The method of claim 1, wherein the baseline value is substantially lower than the initial value for the voltage produced by the battery.

7. The method of claim 3, wherein the baseline value is about 0 volts.

8. The method of claim 1, wherein power is supplied to charge the battery only after a device containing the battery is enumerated.

9. A safety circuit for a charging device comprising:
   a first comparator configured to compare voltage produced by a battery to a threshold, output from the first comparator indicating if a battery is a rechargeable battery or a non-rechargeable battery;
   a second comparator receiving the output from the first comparator, the second comparator latching closed to stop delivery of a charging current to the battery if the battery is non-rechargeable;
   an FET connected to the first comparator, if the battery is a non-rechargeable battery, the FET turning on to drop the threshold from an initial value to a baseline value to latch the first comparator in a high state, and the second comparator in a low state, even if voltage produced by the battery drops below the initial value; and
   a reset circuit coupled to the first comparator and the second comparator, the reset circuit issuing a reset signal to the first comparator and the second comparator each time a battery is connected to the charging device.

10. The safety circuit of claim 9, wherein the battery is a non-rechargeable battery if voltage produced by the battery exceeds the threshold.

11. The safety circuit of claim 9, wherein the baseline value is substantially lower than the initial value.

12. The safety circuit of claim 11, wherein the baseline value is substantially 0 volts.

13. The safety circuit of claim 9, further comprising a noise filter operatively associated with the reset circuit so that noise is not confused as the reset signal.

14. The safety circuit of claim 9, wherein the reset circuit issues the reset signal in response to a connect signal received from an electronic device holding the battery.

15. The safety circuit of claim 14, wherein the connect signal is a signal that accords with a Universal Serial Bus specification.

16. The safety circuit of claim 9, further comprising negative voltage circuit coupled to input on the first comparator, the negative voltage circuit providing protection against a backwards-installed battery.

* * * * *